(12) United States Patent
Arikawa et al.

(10) Patent No.: US 10,893,014 B2
(45) Date of Patent: Jan. 12, 2021

(54) INFORMATION PROCESSING APPARATUS, INFORMATION PROCESSING METHOD, AND NON-TRANSITORY COMPUTER READABLE MEDIUM

(71) Applicant: FUJI XEROX CO., LTD., Tokyo (JP)

(72) Inventors: Kiichiro Arikawa, Kanagawa (JP); Daisuke Yasuoka, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 179 days.

(21) Appl. No.: 15/935,063

(22) Filed: Mar. 26, 2018

(65) Prior Publication Data

US 2019/0089665 A1    Mar. 21, 2019

(30) Foreign Application Priority Data

Sep. 20, 2017 (JP) .................. 2017-180656

(51) Int. Cl.
*H04L 12/58* (2006.01)
*H04L 29/08* (2006.01)

(52) U.S. Cl.
CPC .............. *H04L 51/24* (2013.01); *H04L 51/02* (2013.01); *H04L 51/063* (2013.01); *H04L 67/04* (2013.01); *H04L 67/306* (2013.01)

(58) Field of Classification Search
CPC ... H04N 21/4788; H04L 51/06; H04L 51/066; H04L 12/1813; H04L 65/4084; H04L 51/24; H04L 63/028; H04L 51/02; H04L 51/063; H04L 67/04; H04L 67/306
See application file for complete search history.

(56) References Cited

U.S. PATENT DOCUMENTS

| | | | |
|---|---|---|---|
| 7,209,942 B1 | 4/2007 | Hori et al. | |
| 10,762,533 B2* | 9/2020 | Herberger | G06Q 30/0267 |
| 2004/0247174 A1* | 12/2004 | Lyons | G06F 3/04845 382/154 |
| 2006/0045555 A1* | 3/2006 | Morimoto | G03G 15/507 399/80 |
| 2007/0285701 A1* | 12/2007 | Ohta | G06F 3/1207 358/1.14 |
| 2008/0227435 A1* | 9/2008 | Six | H04L 51/38 455/414.1 |
| 2010/0017240 A1* | 1/2010 | Tamada | G03G 15/0894 705/308 |
| 2011/0307383 A1* | 12/2011 | Ratica | G06Q 30/06 705/44 |
| 2015/0172505 A1* | 6/2015 | Park | H04N 1/00307 358/1.15 |

(Continued)

FOREIGN PATENT DOCUMENTS

| | | |
|---|---|---|
| JP | 2000-250944 | 9/2000 |
| JP | 2003-223406 | 8/2003 |
| JP | 2007-011541 | 1/2007 |

*Primary Examiner* — Sargon N Nano
(74) *Attorney, Agent, or Firm* — JCIPRNET

(57) ABSTRACT

An information processing apparatus includes an acquisition unit, a notification unit, and a controller. The acquisition unit acquires input information including (i) information on a user and (ii) information that the user conveys to an interaction partner. The notification unit notifies information. The controller causes the notification unit to notify output information corresponding to (a) response information, to the input information, from the interaction partner and (b) the notification unit.

12 Claims, 6 Drawing Sheets

(56) References Cited

U.S. PATENT DOCUMENTS

| | | | |
|---|---|---|---|
| 2016/0050263 A1* | 2/2016 | Hwang | H04L 51/04 |
| | | | 709/206 |
| 2016/0050326 A1* | 2/2016 | Lee | H04N 21/2223 |
| | | | 358/402 |
| 2017/0230312 A1* | 8/2017 | Barrett | H04L 51/02 |
| 2017/0250930 A1* | 8/2017 | Ben-Itzhak | G06F 3/011 |
| 2017/0374230 A1* | 12/2017 | Song | H04N 1/32117 |
| 2018/0075847 A1* | 3/2018 | Lee | G06F 16/3329 |
| 2018/0349367 A1* | 12/2018 | Soni | G06F 16/148 |
| 2019/0005022 A1* | 1/2019 | Deshpande | G06F 9/547 |
| 2019/0042663 A1* | 2/2019 | Gupta | G06F 40/279 |
| 2019/0272323 A1* | 9/2019 | Galitsky | G06F 40/205 |
| 2020/0265195 A1* | 8/2020 | Galitsky | G06F 40/253 |

* cited by examiner

FIG.5

<DEVICE MANAGEMENT TABLE>

| DEVICE ID | DEVICE NAME | FUNCTION/PERFORMANCE (SPECIFICATION) | STATE | INFORMATION TRANSFER MEDIUM | ADDRESS |
|---|---|---|---|---|---|
| A | PC 18 | COMMUNICATION FUNCTION, DISPLAY FUNCTION, STORAGE FUNCTION, ... | DURING ACTIVATION | DISPLAY MEDIUM, VOICE MEDIUM | ... |
| B | MULTIFUNCTION MACHINE 20 | COMMUNICATION FUNCTION, PRINTING FUNCTION, SCANNING FUNCTION, COPYING FUNCTION, ... | DURING COPYING | DISPLAY MEDIUM, VOICE MEDIUM, SHEET(A4, ...) | ... |
| C | SMARTPHONE 22 | COMMUNICATION FUNCTION, DISPLAY FUNCTION, STORAGE FUNCTION, ... | DURING ACTIVATION | DISPLAY MEDIUM, VOICE MEDIUM | ... |
| D | ROBOT 24 | CALL FUNCTION, DISPLAY FUNCTION, MOVING FUNCTION | DURING ACTIVATION | DISPLAY MEDIUM, VOICE MEDIUM | ... |
| ... | ... | ... | ... | ... | ... | ically, an image forming apparatus having an image forming function, a personal computer (PC), a tablet PC, a smartphone, a cellular phone, a robot (a humanoid robot, an animal type robot (other than a humanoid robot) or other robots), a projector, a display such as a liquid crystal display, a recording device, a reproduction device, an imaging device such as a camera, a refrigerator, a rice cooker, a microwave oven, a coffee maker, a vacuum cleaner, a washing machine, an air conditioner, a lighting device, a watch, a surveillance camera, a car, a motorcycle, an aircraft (for example, an unmanned aircraft (so-called drone)), a game machine, and the like may be included in the category of the devices according to the present exemplary embodiment. Further, the devices 10 and 12 may be wearable terminals (a wristwatch type terminal, a wristband type terminal, an eyeglass type terminal, a ring type terminal, a contact lens type terminal, an intracorporeal embedded terminal, a hearable terminal, or the like). The devices 10 and 12 may be the same type of devices or different types of devices. In addition, the devices 10 and 12 have a function of exchanging data with other devices.

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-180656 filed Sep. 20, 2017.

BACKGROUND

Technical Field

The present invention relates to an information processing apparatus, an information processing method, and a non-transitory computer readable medium.

SUMMARY

According to an aspect of the invention, an information processing apparatus includes an acquisition unit, a notification unit, and a controller. The acquisition unit acquires input information including (i) information on a user and (ii) information that the user conveys to an interaction partner. The notification unit notifies information. The controller causes the notification unit to notify output information corresponding to (a) response information, to the input information, from the interaction partner and (b) the notification unit.

BRIEF DESCRIPTION OF THE DRAWINGS

Exemplary embodiments of the present invention will be described in detail based on the following figures, wherein:

FIG. 5 is a view illustrating a device management table;

DETAILED DESCRIPTION

Figure 1:
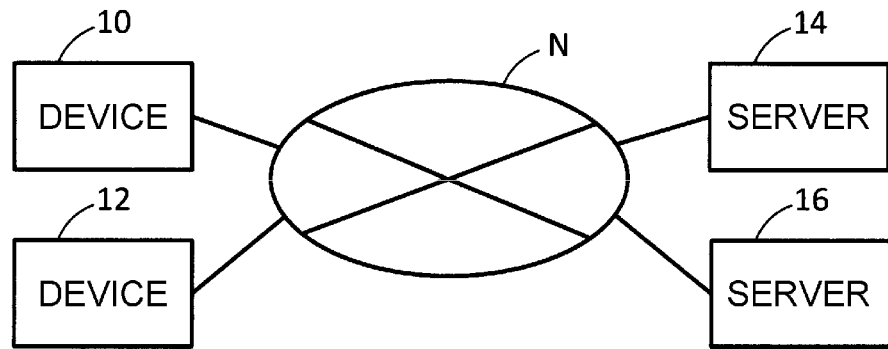
FIG. 1 is a block diagram illustrating an information processing system according to an exemplary embodiment of the present invention.

Hereinafter, an information processing system according to an exemplary embodiment of the present invention will be described with reference to FIG. 1. FIG. 1 illustrates an example of the information system according to the present exemplary embodiment.

As an example, the information processing system according to the present exemplary embodiment includes devices (for example, devices 10 and 12) and servers (for example, servers 14 and 16). In the example illustrated in FIG. 1, the devices 10 and 12 and the servers 14 and 16 have a function of communicating with each other via a communication path N such as a network. The devices 10 and 12 and the servers 14 and 16 may communicate with each other via their respective different communication paths, instead of the communication path N. In the example illustrated in FIG. 1, two devices (the devices 10 and 12) are provided in the information processing system. Alternatively, one device may be provided in the information processing system or three or more devices may be provided in the information processing system. In addition, in the example illustrated in FIG. 1, the two servers (the servers 14 and 16) are provided in the information processing system. Alternatively, one server may be provided in the information processing system or three or more servers may be provided in the information processing system.

The devices 10 and 12 are devices having functions. All general kinds of devices may be included in the category of the devices according to the present exemplary embodiment. For example, an information device, a video device, an audio device, and other devices may be included in the category of the devices according to the present exemplary embodiment. Specif- The server 14 is a device that manages protected information. The protected information is, for example, information that is permitted to be accessed from a user, a device, or a location authorized to access the protected information and is prohibited from being accessed from other users, devices, or locations. The server 14 is, for example, a server for in-house use. The sever is permitted to be accessed from the inside of a building of a company, from a device installed in the company or from an employee of the company, and is prohibited from being accessed from other users, devices or locations. The protected information managed by the in-house server 14 is information on the company. The protected information includes, for example, information on products handled by the company, information on customers of the company, information on employees of the company (for example, information on a department to which each employee belongs, information on employee's history, information on evaluation of each employee, and the like), information on a business of the company (for example, information on performance, information on business skills, information on employee training, information on various materials created by employees, and the like), information on facilities of the company (for example, information on the arrangement of each department, information on the company cafeteria, information on the restaurant, and the like), information on assets of the company, and the like. By managing the protected information by the server 14, leakage of the protected information is prevented or suppressed, as compared with a case where the protected information is managed by the server 16 which will be described below.

The server 16 is a device that manages general-purpose information. For example, the general-purpose information is information that is permitted to be accessed irrespective of the presence/absence of the access authority. For example, the server 16 has a function of collecting various kinds of information using the Internet, social network service (SNS) and the like. The server 16 may be a server installed on a so-called cloud system.

In the devices 10 and 12, an interaction partner having a function of interacting with a user is used. For example, the interaction partner has a function of receiving a user's message, analyzing the message content, creating a response such as a reply to the message, and providing the response to the user. For example, the user's message is made by character input, voice input, image input or the like. The response such as the reply is made by character output, voice output, image output or the like. The interaction partner is implemented, for example, by executing a program which is installed in, for example, the devices 10 and 12. In addition, the program related to the interaction partner may be installed in the servers 14 and 16 and the function of the interaction partner may be provided from the servers 14 and 16 to the devices 10 and 12.

The above interaction partner is configured with, for example, an automatic response artificial intelligence (AI) implemented by AI. The automatic response AI has a function of analyzing the user's message content and providing the user with a response such as a reply to the message content. The automatic response AI may be a so-called chatbot (an automatic chatting program utilizing AI). The automatic response AI has an artificial intelligent learning function which may have the ability to make a decision similar to a human decision. In addition, the automatic response AI may use, for example, neural network type deep learning, reinforcement learning which partially strengthens the learning field, a genetic algorithm, cluster analysis, a self-organization map, or ensemble learning. Technology related to AI other than the above described ones may be used.

In the present exemplary embodiment, input information including (i) information on a user and (ii) a state that the user conveys something to an interaction partner is input to a device. Output information corresponding to (a) response information, to output information, from the interaction partner and (b) a notification unit that notifies information to the user is notified to the user by the notification unit.

Figure 2:
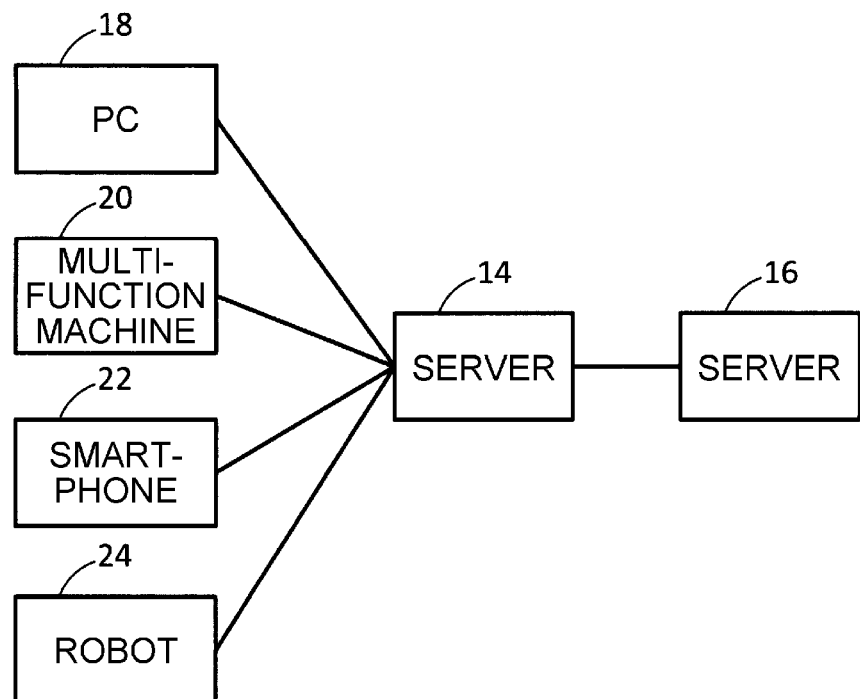
FIG. 2 is a block diagram illustrating specific examples of devices included in the information processing system.

Hereinafter, examples of the devices 10 and 12 will be described with reference to FIG. 2. Examples of the devices 10 and 12 are illustrated in FIG. 2. In the following description, it is assumed that the server 14 is a server for in-house use. For example, a PC 18, a multifunction machine 20, a smartphone 22, and a robot 24 are provided, as devices, in the information processing system. The PC 18 is, for example, an employee PC and is a device installed in the desk of an employee in an office. The multifunction machine 20 has an image forming function (for example, at least one of a printing function, a scanning function, a copying function or a facsimile function). The multifunction machine 20 is a device installed in the office. The smartphone 22 is a portable terminal device having a communication function. The smartphone 22 may be an employee's own smartphone or may be a smartphone lent from the company to the employee. The robot 24 is a device installed at the employee's home. The PC 18, the multifunction machine 20, the smartphone 22, and the robot 24 are equipped with their respective automatic response AIs. Each device may be equipped with the automatic response AIs which have the same performance or different performances. The devices illustrated in FIG. 2 are merely examples. Devices other than the illustrated devices may be provided in the information processing system. Some of the illustrated devices may be omitted from the information processing system. All of the illustrated devices may not be provided in the information processing system, and other devices may be provided in the information processing system.

Figure 3:
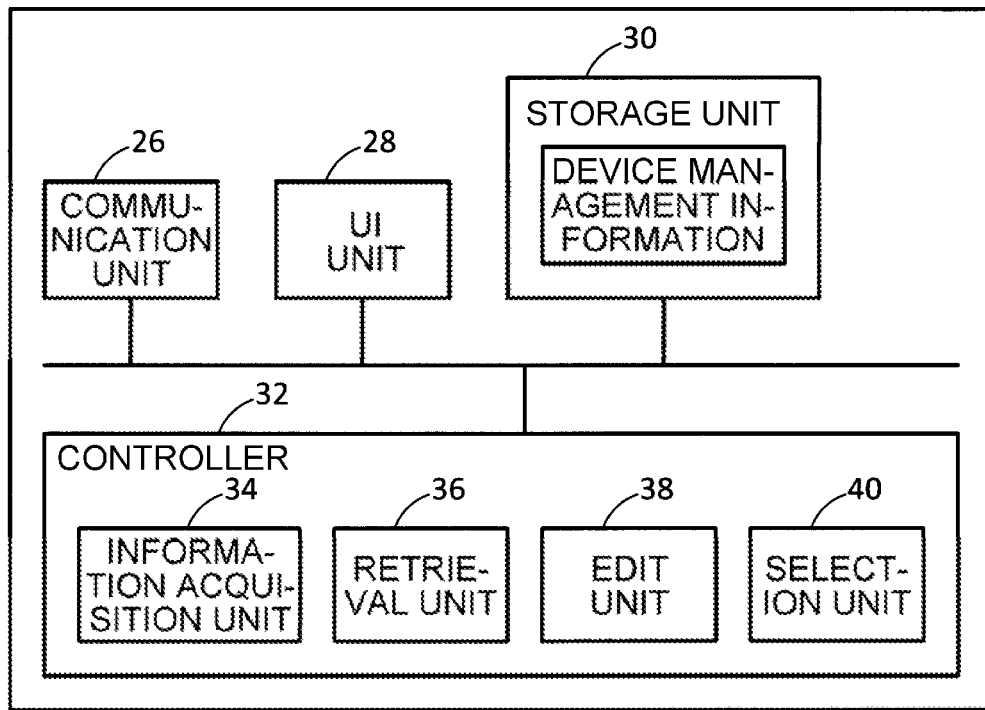
FIG. 3 is a block diagram illustrating components that a device has at least.

Hereinafter, components that a device has at least will be described with reference to FIG. 3. FIG. 3 illustrates the components. All devices may not have the components illustrated in FIG. 3. A part of the devices may have the components illustrated in FIG. 3. For example, the PC 18, the multifunction machine 20, the smartphone 22, and the robot 24 illustrated in FIG. 2 have the components illustrated in FIG. 3. In addition to the components illustrated in FIG. 3, the PC 18, the multifunction machine 20, the smartphone 22, and the robot 24 have components for implementing their respective functions. The illustrated components will be described in detail below.

A communication unit 26 is a communication interface and has a function of transmitting data to other devices and a function of receiving data from other devices. The communication unit 26 may be a communication interface having a wireless communication function or a communication interface having a wired communication function. For example, the communication unit 26 is compatible with one or more types of communication systems. The communication unit 26 may communicate with a communication partner according to a communication system suitable for the communication partner (that is, a communication system with which the communication partner is compatible). Examples of the communication system include infrared communication, visible light communication, Wi-Fi (registered trademark) communication, and close proximity wireless communication (for example, near field communication (NFC), and the like). Felica (registered trademark), Bluetooth (registered trademark), radio frequency identifier (RFID) or the like is used as the close proximity wireless communication. In addition, other types of wireless communications may be used as the close proximity wireless communication. For example, the communication unit 26 may switch a communication system or a frequency band depending on a communication partner or the surrounding environments.

A UI unit 28 is a user interface unit and includes a display and an operation unit. The display is, for example, a display device such as a liquid crystal display. The operation unit is an input device such as a touch panel or a keyboard. In addition, the UI unit 28 may be a user interface that serves as both of a display and an operation unit (examples of the user interface include a touch type display and a device for electronically displaying a keyboard or the like on a display). Further, the UI unit 28 may include a sound collection unit such as a microphone and a sound generation unit such as a speaker. In this case, information may be input to the device by voice input, and information may be issued from the device by voice.

A storage unit 30 is a storage device such as a hard disk or a memory (for example, an SSD). The storage unit 30 stores, for example, device management information, various data, various programs (for example, an operating system (OS), a program (software) for implementing an automatic response AI, various application programs (application software), and the like), information indicating addresses of the servers 14 and 16 (server address information), and the like. These may be stored in separate storage devices or one storage device. The program for implementing the automatic response AI may be stored in each of the servers 14 and 16. The programs for implementing the automatic response AI may be executed by the servers 14 and 16 so as to provide the function of the automatic response AI from the servers 14 and 16 to the devices. In this case, the program for implementing the automatic response AI may not be stored in the storage unit 30.

The device management information is information for managing the devices provided in the information processing system. For example, the device management information is information indicating, for each device, a correspondence relationship between device identification information for identifying the device, information indicating a type of the device, capability information indicating the capability of the device, status information indicating a status of the device, medium information indicating an information conveyance medium of the device, and information indicating an address of the device (device address information).

For example, the device management information is stored in each of the PC 18, the multifunction machine 20, the smartphone 22, and the robot 24. Each of the PC 18, the multifunction machine 20, the smartphone 22, and the robot 24 periodically communicate with the other devices at a predetermined timing or at a timing when a user or an administrator gives an instruction, so as to acquire the capability information, status information, and information conveyance media of the other devices and store the device management information including these pieces of information. In this manner, the information of the devices is updated.

The device management information may be stored in the server 14. For example, when a device is registered in the information processing system, device identification information, type information, capability information, medium information, and device address information of the device are registered in the device management information stored in the server 14. In addition, the server 14 periodically acquires information from each device at a predetermined timing or at a timing when a user or the administrator gives an instruction and updates the device management information. In a case where the device management information is stored in the server 14, the device management information may not be stored in the PC 18, the multifunction machine 20, the smartphone 22, and the robot 24. In this case, the PC 18, the multifunction machine 20, the smartphone 22, and the robot 24 each accesses the server 14 and refers to the device management information stored in the server 14, to thereby identify the capability and status of each device. In addition, the device management information may be stored only in a specific device, and the other devices may access the specific device to identify the capability and status of each device.

The device identification information includes, for example, a device ID, a device name, a device model number, information for managing the device (for example, a property management number or the like), information indicating a position where the device is installed (device position information), and the like.

The capability information is information indicating the performance of the device, a function of the device, a process executable by the device, and the like. The performance of the device may be, for example, the performance of hardware of the device (for example, the performance of a processor such as a CPU, the capacity of a storage device such as a memory and an HDD, the communication speed, the performance of an electronic circuit, the resolution of a display, and the unique function of the device), the performance of software installed in the device (an executable process or the like), and the like. For example, the processing speed and the quality (accuracy) of a processing result correspond to the performance of the device. Examples of the quality (accuracy) include the quality of an image obtained as a result of the processing (color or monochrome, resolution, and the like), and the quality of a sound obtained as a result of the processing (the width of a sound range, and the like). The capability information included in the device management information is referred to, to specify the capability of the device.

Examples of the state of the device include a state in which the device is activated but does not execute a process (state of power-on), a state in which the device is executing a process, a state in which an error has occurred, a state in which the device is powered-off, a sleep state (a state in which power is being supplied to only a part of the device), a state in which the device is in failure, and a state in which the device is in maintenance. The status information included in the device management information is referred to, to specify the state of the device.

The information conveyance medium is a medium for notifying the user of information. Examples of the information conveyance medium include a display medium, a voice medium, and a paper medium. The display medium corresponds to a display, the voice medium corresponds to a speaker, and the paper medium corresponds to a sheet of paper. It may be said that the display medium or the voice medium are configured with the UI unit 28. The medium information includes, for example, information indicating the performance of the display medium of the device (for example, the size and resolution of a display), information indicating the performance of the voice medium of the device (for example, the performance of a speaker), the sheet type of the device (for example, size and quality of the paper, and the like), and the like. The medium information included in the device management information is referred to, to specify the information conveyance medium of the device.

The controller 32 has a function of controlling the operations of the respective components of the device. The controller 32 controls, for example, communication by the communication unit 26, display of information on the display of the UI unit 28, voice output, and the like. Further, the controller 32 includes an information acquisition unit 34, a retrieval unit 36, an edit unit 38, and a selection unit 40.

The information acquisition unit 34 has a function of acquiring input information including (i) information on a user and (ii) information that the user conveys to an interaction partner. The information on the user is, for example, personal information of the user. For example, the information acquisition unit 34 may read personal information from an IC card that stores the user's personal information, or may communicate with a portable device (for example, a smartphone, a mobile phone, a tablet PC or the like) carried by the user to acquire personal information stored in the portable device from the portable device. When the personal information is stored in the server 14, the information acquisition unit 34 may acquire personal information from the server 14. The information that the user conveys to the interaction partner is information indicating a user's message content to the interaction partner (interaction information). The message content is input by the user with characters, voice, images or the like. The information acquisition unit 34 acquires the information indicating the message contents input by the user. A process by the information acquisition unit 34 may be executed by an automatic response AI.

The retrieval unit 36 has a function of retrieving information conforming to the input information from the protected information and the general-purpose information using the input information as a retrieval key. The information obtained by the retrieval corresponds to response information from the interaction partner (the automatic response AI). The process by the retrieval unit 36 may be executed by the automatic response AI.

The edit unit 38 has a function of generating output information by editing the response information retrieved by the retrieval unit 36 so as to be compatible with the notification unit of the device. The notification unit is a unit that notifies the user of information. The notification unit is, for example, an information conveyance medium of the device. The controller 32 notifies the user of the output information through the information conveyance medium. For example, the controller 32 may display the output information on the display of the UI unit 28, may output the output information as voice information, may control printing of the output information on a sheet of paper, may store the output information in a storage device such as an HDD or a memory, or may transmit the output information to another device. The process by the edit unit 38 may be executed by the automatic response AI.

The selection unit 40 has a function of selecting, from a group of devices provided in the information processing system, a device having superiority over other candidate devices (hereinafter referred to as a "superiority device") as a device for processing the response information, to the input information, from the interaction partner. The selection unit 40 may select the server 14 as the superiority device or may select its own device as the superiority device. The superiority device is a device suitable for processing the response information. For example, a device with the highest processing speed, a device with the highest communication speed, a device installed at a position closest to the user, a device in which specific software for processing the response information is installed, or a device with the highest processing quality may be selected as the superiority device. A device having superiority over other candidate devices in terms of performance, function or state may be selected as the superiority device. When the superiority device is selected by the selection unit 40, the controller 32 transmits the input information to the superiority device. The retrieval unit 36 of the superiority device retrieves the response information applicable to the input information from the protected information and the general-purpose information using the input information as a retrieval key. In addition, the edit unit 38 of the superiority device generates the output information by editing the response information to be compatible with a notification unit (information conveyance medium) of a transmission source device that transmits the input information (input information transmission source device). The superiority device transmits the output information to the transmission source device. The transmission source device notifies the user of the output information transmitted from the superiority device by the information conveyance medium of the transmission source device. The process by the selection unit 40 may be executed by the automatic response AI.

The selection unit 40 may select the superiority device from a device group available to the user. A device available to the user is a device for which the user has operation authority or a device that is usable regardless of the presence/absence of the operation authority.

The retrieval by the retrieval unit 36 may be executed by the input information transmission source device, and the edit by the edit unit 38 may be executed by the superiority device. In this case, the retrieval unit 36 of the transmission source device retrieves the response information and the controller 32 of the transmission source device transmits the response information to the superiority device. The edit unit 38 of the superiority device generates the output information by editing the response information to be compatible with the information conveyance medium of the transmission source device that transmits the response information. The superiority device transmits the output information to the transmission source device.

In another example, the retrieval by the retrieval unit 36 may be executed by the superiority device, and the edit by the edit unit 38 may be executed by the transmission source device. In this case, the controller 32 of the transmission source device transmits the input information to the superiority device and the retrieval unit 36 of the superiority device retrieves the response information using the input information as a retrieval key. The superiority device transmits the response information to the transmission source device. The edit unit 38 of the input information transmission source device generates the output information by editing the response information to be compatible with the information conveyance medium of the input information transmission source device.

In addition, depending on the type and capability (performance) of the input information transmission source device (the device with which the user is interacting), the retrieval by the retrieval unit 36 may be executed by either one of the input information transmission source device or the superiority device. Likewise, depending on the type and capability of the input information transmission source device, the edit by the edit unit 38 may be executed by either the input information transmission source device or the superiority device.

For example, in the case where the device with which the user is interacting is the PC 18, the multifunction machine 20 or the robot 24, the retrieval by the retrieval unit 36 is executed by the superiority device and the edit by the edit unit 38 is executed by the device with which the user is interacting. As a result of the retrieval executed by the superiority device, a time required for the retrieval is shorter than that in a case where the retrieval is executed by a device other than the superiority device. In addition, by editing the response information by the device with which the user is interacting, the on-demand capability by interaction is improved over a case where the response information is edited by another device and the output information is transmitted from the other device to the device with which the user is interacting. In other words, the time required for editing the response information in accordance with user's interaction content and notifying the response information to the user is shortened. The own device may be selected as the superiority device.

In a case where the user is interacting with the smartphone 22, the retrieval by the retrieval unit 36 and the edit by the edit unit 38 are executed by the superiority device, and the output information is transmitted from the superiority device to the smartphone 22. In this case, an amount of data communication by the smartphone 22 is equal to a sum of an amount of data communication when the input information is transmitted from the smartphone 22 to the superiority device and an amount of data communication when the output information is transmitted from the superiority device to the smartphone 22. Thus, the amount of data communication by the smartphone 22 is reduced as compared with a case where the retrieval is executed by the smartphone 22. For example, in a case where the user does not want to increase the amount of data communication of the smartphone 22, the user's demand is implemented by executing the processes in the above described manner.

The edit unit 38 of the superiority device may generate the output information by editing the response information so as to be compatible with the information conveyance medium of the superiority device. In this case, the controller 32 of the superiority device notifies the user of the output information by the superiority device. For example, when the user designates the superiority device as a device that notifies the output information, the superiority device generates the output information and notifies the output information to the user.

Figure 4:
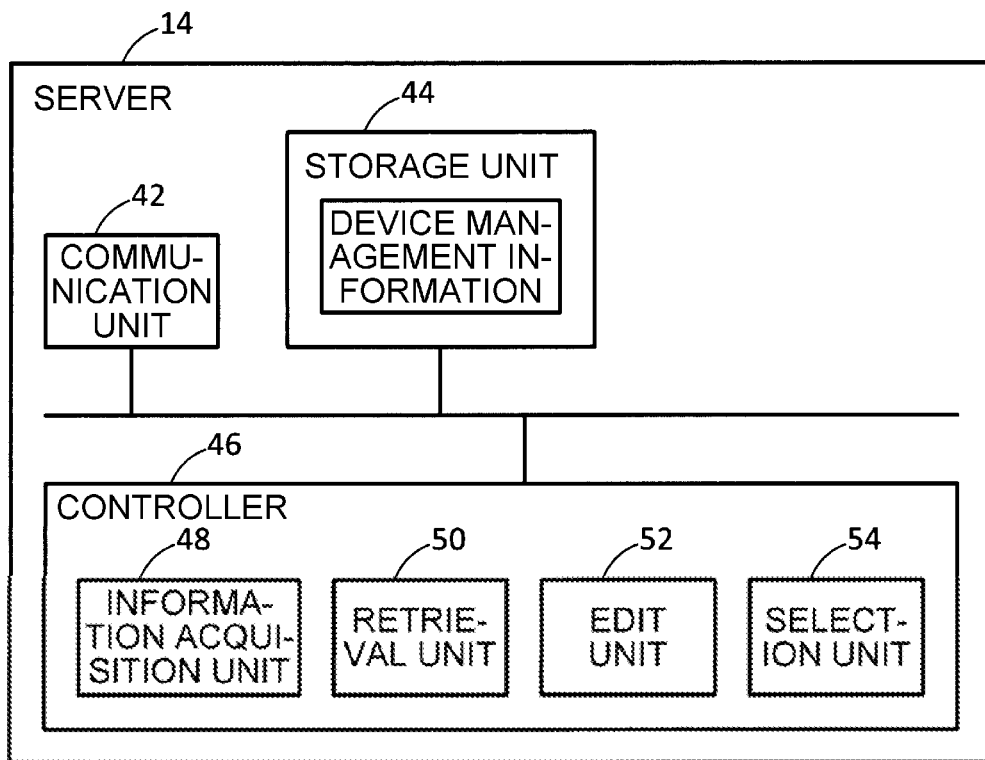
FIG. 4 is a block diagram illustrating a server.

Hereinafter, components that the server 14 has at least will be described with reference to FIG. 4. FIG. 4 illustrates the components.

A communication unit 42 is a communication interface. The communication unit 42 has a function of transmitting data to other devices and a function of receiving data from other devices. The communication unit 42 may be a communication interface having a wireless communication function or a communication interface having a wired communication function.

A storage unit 44 is a storage device such as a hard disk or a memory such as SSD. The storage unit 44 stores, for example, various data, various programs, information indicating the address of the server 16, and the like. These may be stored in separate storage devices or one storage device. The device management information is also stored in the storage unit 44.

A controller 46 controls operations of the respective components of the server 16. For example, the controller 46 controls communication by the communication unit 42. Further, the controller 46 includes an information acquisition unit 48, a retrieval unit 50, an edit unit 52 and a selection unit 54. The information acquisition unit 48, the retrieval unit 50, the edit unit 52 and the selection unit 54 have the same functions as the information acquisition unit 34, the retrieval unit 36, the edit unit 38, and the selection unit 40 provided in the device, respectively. Therefore, descriptions of the information acquisition unit 48, the retrieval unit 50, the edit unit 52, and the selection unit 54 will be omitted.

Hereinafter, the information processing system according to the present exemplary embodiment will be described in more detail.

The device management information will be described in detail with reference to FIG. 5. FIG. 5 illustrates an example of a device management table as the device management information. In this example, for each device, a device ID, information indicating a device name (for example, the type and unique name of the device, and the like), capability information indicating the capability of the device (for example, the function or performance (specifications)), status information indicating a state of the device, medium information indicating the information conveyance medium of the device, and information indicating an address of the device are associated with each other in the device management table. In addition, information indicating an installation position of the device, information indicating a communication status of the device, and the like may be included in the device management table. The communication status is the current communication speed, the presence/absence of communication failure, or the like. The device ID and the device name are an example of the device identification information. For example, a device whose device ID is "A" is the PC 18 and has a communication function, a display function and the like. The PC 18 is currently in the state of being activated, and the information conveyance medium of the PC 18 is a display medium and a voice medium. When the capability of the device is changed (for example, when the specifications of the device are changed), the capability information is updated. Similarly, when the state of the device is changed, the status information is updated. When the information conveyance medium of the device is changed, the medium information is updated. When the device address is changed, the address information is updated. The device management table is referred to, to specify the capability of each device, the state of each device, the information conveyance medium of each device, the address of each device. In addition, the installation position of each device and the communication status of each device are specified.

Hereinafter, the operation of the information processing system according to the present exemplary embodiment will be described in detail by way of specific examples.

Example 1

Figure 6:
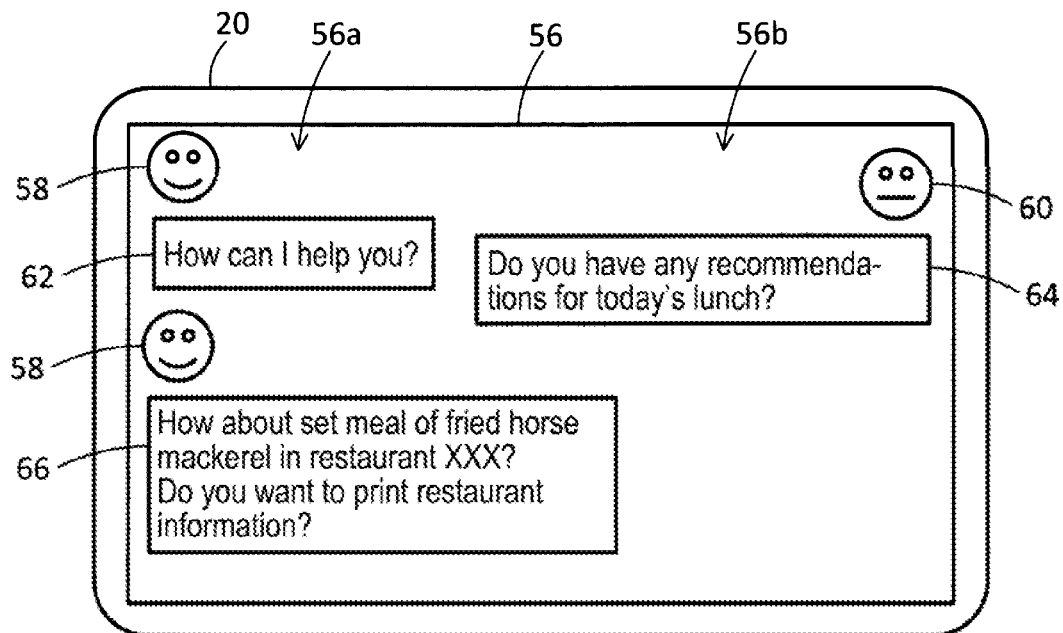
FIG. 6 is a view illustrating a screen.

Example 1 will be described with reference to FIG. 6. In Example 1, the user interacts with the automatic response AI installed in the multifunction machine 20. FIG. 6 illustrates an example of a screen displayed on the multifunction machine 20.

The controller 32 of the multifunction machine 20 causes the display of the UI unit 28 of the multifunction machine 20 to display a screen 56 on which various pieces of information are displayed. The screen 56 is a user interface (interaction response screen) for the user to interact with the automatic response AI. Information (for example, a character string, an image, or the like) input by the user to the multifunction machine 20 and information (for example, a character string, an image, or the like) indicating content of a message of the automatic response AI are displayed on the screen 56. The interaction between the user and the automatic response AI may be a so-called chat-type interaction (that is, a real-time interaction, in further other words, a form in which the interaction progresses while the user and the automatic response AI post messages to each other). For example, by executing a program (for example, a chatting program) for interaction with the automatic response AI, the screen 56 (the interaction response screen) for the interaction is displayed on the display of the UI unit 28.

A display area for each interlocutor may be provided on the screen 56. The content of a message of each interlocutor may be displayed in its own display area. For example, a display area 56a is an area in which the message content of the automatic response AI is displayed. A display area 56b is an area in which the user's message content (information that the user inputs to the multifunction machine 20) is displayed. In the example illustrated in FIG. 6, the display area 56a for the automatic response AI is provided on the left side toward the screen 56, and the display area 56b for the user is provided on the right side. This display example is merely illustrative. The arrangement relation between the display areas may be reversed, each display area may be arranged in the vertical direction, the display areas may entirely or partially overlap with each other, or the latest message content may be displayed in a specific area (for example, the central area) of the screen 56 while the past message content may be displayed around the specific area. In addition, the display areas may have the same size or different sizes. The display areas may be enlarged or reduced in accordance with the amount of message content at a time and the number of messages. The settings and sizes of the display areas are controlled by the controller 32.

In the example illustrated in FIG. 6, the interlocutors are one user and one automatic response AI. Alternatively, plural users and plural automatic response AIs may participate in the interaction. In this case, a display area for each interlocutor may be provided on the screen 56. For example, when two users and one automatic response AI participate in the interaction, three display areas are provided on the screen 56, and the content of a message of each interlocutor is displayed in its own display area. For example, when the plural users interact via the screen 56 by communicating between plural devices, the message content of the plural users are displayed on the screen 56. The same is true when the plural automatic response AIs participate in the interaction. Programs related to the plural automatic response AIs may be installed in the one and same device, and the plural automatic response AIs may be stored in the one and same device. Alternatively, the programs related to the plural automatic response AIs may be installed in different devices, and the automatic response AIs may be stored in the different devices. For example, the message content of the automatic response AI stored in its own device are displayed on the screen 56 and the message content of the automatic response AI stored in another device are displayed on the screen 56. The automatic response AI stored in another device participates in the interaction via the communication path N, for example.

When the chatting program is activated, the controller 32 of the multifunction machine 20 causes the display of the UI unit 28 of the multifunction machine 20 to display the screen 56. An image 58 associated with the automatic response AI is displayed in the display area 56a for the automatic response AI. An image 60 associated with the user is displayed in the display area 56b for the user. The image 58 is an image for identifying the automatic response AI. The image 60 is an image for identifying the user. Instead of the image 58 or in addition to the image 58, a character string indicating the automatic response AI (a character string for identifying the automatic response AI) may be displayed. Similarly, instead of the image 60 or in addition to the image 60, a character string indicating the user (a character string for identifying the user, such as a name, a user ID, a handle name, or a nickname) may be displayed.

Thereafter, an interaction is made between the user and the automatic response AI. In the interaction, the user's message content may be input to the multifunction machine 20 by the user operating the UI unit 28 to input information such as a character string or an image, or may be input by voice. In addition, the user's message content may be displayed on the screen 56 as information such as a character string or an image, or may not be displayed. Similarly, the message content of the automatic response AI may be displayed on the screen 56 as information such as a character string or an image, may not be displayed, or may be output by voice while being displayed. As an example, the following description is premised on that the message content of each interlocutor is displayed on the screen 56. Alternatively, the message content may be output by voice.

When the interaction progresses on the screen 56, the screen 56 scrolls so that the past message content that cannot be displayed on the screen 56 disappear from the screen 56, and the latest message content and the message content immediately before the latest message content is displayed on the screen 56.

When the chatting program is activated, first, the automatic response AI issues a general question (a question asking a user's request) such as "How can I help you?", and a character string indicating the question is displayed in the display area 56a as message content 62 of the automatic response AI. Instead of the character string or in addition to the character string, the message content of the automatic response AI may be issued by voice. Since the message content 62 come from the automatic response AI, the controller 32 of the multifunction machine 20 displays the message content in the display area 56a as the message content associated with the image 58 of the automatic response AI. The same is true of the following interaction.

Next, when the user posts a message that "Do you have any recommendations for today's lunch?" or the like, the message content 64 are displayed in the display area 56b. The user may input information indicating the message content 64 to the multifunction machine 20 by operating the screen 56 to input a character string, or may input information indicating the message content 64 to the multifunction machine 20 by voice. Since the message content 64 come from the user, the controller 32 of the multifunction machine 20 displays the message content 64 in the display area 56b as the message content associated with the user's image 60. The same is true of the following interaction.

The information acquisition unit 34 of the multifunction machine 20 acquires the information indicating the message content 64 as interaction information that the user conveys to the interaction partner (the automatic response AI). Further, the information acquisition unit 34 of the multifunction machine 20 acquires personal information of the user from an employee ID card (an IC card) or a device (for example, a smartphone or the like) carried by the user. The personal information includes information indicating the name of the user, an employee number, information indicating a department to which the user belongs, information indicating an amount of activity of the user, and the like. The information acquisition unit 34 of the multifunction machine 20 acquires, for example, information indicating the amounts of activity of today and the previous day as information indicating the activity amount. For example, it is assumed that the amounts of activity of today and the previous day are relatively large. The information acquisition unit 34 of the multifunction machine 20 may acquire biometric information of the user, or may acquire information indicating the user's emotion by analyzing a face image of the user.

The above personal information and interaction information constitute the input information. Using the input information as a retrieval key, the retrieval unit 36 of the multifunction machine 20 retrieves information applicable to the input information from the protected information and the general-purpose information.

For example, a history of meals each employee has had in an employee cafeteria in the past is managed for each employee. Information on the history of meals of each employee is included in the protected information. The retrieval unit 36 of the multifunction machine 20 retrieves the meal history information of the user who is interacting with the automatic response AI, from the protected information. For example, it is assumed that the meal content in the past month at the employee cafeteria is many meat dishes, high volume and frequent ingestion.

Further, the retrieval unit 36 uses the Internet or SNS to retrieve detailed information on meals and foodstuffs, information indicating comments of persons who ingest the meals, and the like from the general-purpose information.

The personal information, the interaction information, the information extracted from the protected information, and the information extracted from the general-purpose information in Example 1 are summarized as follows.

Personal information: large activity amounts of today and the previous day

Interaction information: "Do you have any recommendations for today's lunch?"

Information extracted from the protected information: the meal content in the past month at the employee cafeteria is many meat dishes, high volume and frequent ingestion Information extracted from the general-purpose information: detailed information on meals and foodstuffs, and comments of persons who ingest the meals The retrieval unit 36 of the multifunction machine 20 analyzes the personal information, the interaction information, the information extracted from the protected information, and the information extracted from the general-purpose information, and utilizes a result of the analysis to retrieve recommended restaurants and menu information from the protected information and the general-purpose information. In the above example, since the frequency of taking meat dish is high in the past month, the retrieval unit 36 of the multifunction machine 20 retrieves a restaurant serving a dish other than the meat dish, for example, a fish dish. In addition, since the user takes a large volume of meal, the retrieval unit 36 retrieves a restaurant serving a large volume of fish dishes. Further, the retrieval unit 36 retrieves menu information of the restaurant. Furthermore, the retrieval unit 36 may retrieve detailed information on the foodstuffs being used and information indicating comments of the persons who have the restaurant's dishes. The retrieval unit 36 uses the Internet or SNS to retrieve the above information. The information obtained by the above retrieval corresponds to the response information from the interaction partner (automatic response AI).

The retrieval unit 36 of the multifunction machine 20 may execute the above retrieval to obtain the response information. Alternatively, the retrieval unit 50 of the server 14 may execute the above retrieval to obtain the response information. When the server 14 executes the retrieval, the multifunction machine 20 transmits the above input information (information including the personal information and the interaction information) to the server 14, the retrieval unit 50 of the server 14 retrieves the above response information using the input information transmitted from the multifunction machine 20 as a retrieval key. The server 14 transmits the response information to the multifunction machine 20.

When the response information is obtained as described above, the edit unit 38 of the multifunction machine 20 edits the response information to be compatible with the information conveyance medium of the multifunction machine 20. As a result, the output information is generated. The multifunction machine 20 has a display medium (display), a sound medium (speaker) and a paper medium (A4 sheet or the like) as the information conveyance medium. For example, when an A4 sheet is accommodated in the multifunction machine 20, the edit unit 38 of the multifunction machine 20 edits the response information into information that may be printed within one A4 sheet. Specifically, the edit unit 38 of the multifunction machine 20 adjusts the layout of character strings, images, tables, graphs and the like indicated by the response information. Further, the edit unit 38 of the multifunction machine 20 may give a priority to each piece of information included in the response information and include information whose priority is equal to or higher than a predetermined priority in the output information. For example, the priorities of an image and a graph are set relatively high, and the priority of character information is set relatively low. In addition, even the priority of the character information may be set relatively high when a character string of the character information appears plural times. The above edit may be executed by the edit unit 52 of the server 14. In this case, the server 14 transmits the output information to the multifunction machine 20.

When the output information is generated as described above, the controller 32 of the multifunction machine 20 controls notification of the output information to the user. For example, the controller 32 of the multifunction machine 20 displays the output information in the display area 56a as message content 66 of the automatic response AI. For example, the message content 66 such as "How about a set meal of fried horse mackerel in restaurant XXX?" is displayed. Further, without or while displaying the message content 66, the controller 32 of the multifunction machine 20 may output the output information as voice information using a speaker. In this case, the message content 66 is read. This reading may be executed by the automatic response AI. Further, content such as "Do you want to print the restaurant information?" may be included in the message content 66. When the user gives an instruction to display the restaurant information to the multifunction machine 20, the controller 32 of the multifunction machine 20 causes the display of the UI unit 28 of the multifunction machine 20 to display the restaurant information. For example, a menu, business hours, a map, and the like are displayed. Further, when the user gives an instruction to print the restaurant information to the multifunction machine 20, the multifunction machine 20 prints the restaurant information on one A4 sheet. The controller 32 of the multifunction machine 20 may cause the display of the UI unit 28 of the multifunction machine 20 to display a preview screen before printing.

As described above, according to Example 1, the response information from the interaction partner (the automatic response AI) is edited into information compatible with the information conveyance medium of the multifunction machine 20 and is notified to the user.

In Example 1, in a case where the edit unit 38 of the multifunction machine 20 cannot edit the response information so as to be compatible with the notification unit of the multifunction machine 20, the controller 32 of the multifunction machine 20 transmits the response information and the input information to a device (an external device) other than the multifunction machine 20. In this case, the controller 32 of the multifunction machine 20 notifies the user of a message indicating that the response information cannot be notified. For example, the controller 32 of the multifunction machine 20 may cause the display of the UI unit 28 of the multifunction machine 20 to display the message, or may output the message as voice information.

The case where the response information cannot be edited so as to be compatible with the notification unit is a case where the multifunction machine 20 does not have an information conveyance medium suitable for notifying the response information. For example, in a case where the response information includes moving image data and the multifunction machine 20 does not have a moving image reproducing function or does not have a display capable of reproducing a moving image, this means that the multifunction machine 20 has no information conveyance medium suitable for notifying the response information. Further, in a case where the multifunction machine 20 does not have a voice reproducing function or does not have a speaker and the response information includes voice data, this means that the multifunction machine 20 has no information conveyance medium suitable for notifying the response information.

The external device is a device having an information conveyance medium suitable for notifying the response information. The controller 32 of the multifunction machine 20 refers to the device management table illustrated in FIG. 5 to specify a device having an information conveyance medium suitable for notifying the response information as a transmission destination external device. For example, in the case where the response information includes moving image data and the PC 18 has a moving image reproducing function and has a display capable of reproducing moving images, the controller 32 of the multifunction machine 20 specifies the PC 18 as the transmission destination external device, and the multifunction machine 20 transmits the response information and the input information to the PC 18. In this case, the controller 32 of the multifunction machine 20 notifies the user of a message indicating that the response information and the input information are transmitted to the PC 18. The controller 32 of the multifunction machine 20 may cause the display of the UI unit 28 of the multifunction machine 20 to display the message or may output the message as voice information. Thus, the user may recognize that the output information is notified by a device (the PC 18 in the above example) other than the multifunction machine 20.

The edit unit 38 of the external device (for example, the PC 18) that receives the response information and the input information edits the response information so as to be compatible with the information conveyance medium of the PC 18. As a result, the output information is generated. For example, the edit unit 38 of the PC 18 edits moving image data included in the response information into moving image data that can be reproduced on the display of the PC 18. The controller 32 of the PC 18 causes the display to display the edited moving image data.

As described above, the response information and the input information are transmitted to the external device and the external device is caused to notify the output information to the user. Thus, even when a device (for example, the multifunction machine 20) having the automatic response AI with which the user is interacting cannot edit the response information to be compatible with the information conveyance medium of the device, the information conveyance medium suitable for notifying the response information is used to notify the output information to the user.

In addition, the controller 32 of the multifunction machine 20 may edit the personal information of the user included in the input information into information based on which the user is not identified and transmit the input information to the external device. For example, the controller 32 of the multifunction machine 20 encrypts the personal information by a predetermined encryption scheme and transmits the input information including the encrypted personal information to the external device. The controller 32 of the external device (for example, the PC 18) decrypts the encrypted personal information by a decryption scheme corresponding to the encryption scheme. Thus, the original personal information is generated. Encrypting the personal information prevents or suppresses leakage of the personal information.

Further, the edit unit 38 of the multifunction machine 20 may edit the response information in accordance with the characteristics of the user. The characteristics of the user are, for example, the character of the user (impatient, easygoing, or the like), the condition of the user (for example, a degree of fatigue), and the like. Information indicating the characteristics of the user is included, for example, in the personal information acquired by the information acquisition unit 34 of the multifunction machine 20. Further, the information acquisition unit 34 of the multifunction machine 20 may capture a face or a body of the user with a camera, and determine the conditions of the user from an image showing the user's face or body. In addition, the information acquisition unit 34 of the multifunction machine 20 may determine the characteristics of the user based on the message content input by the user during the interaction with the automatic response AI. For example, when the user inputs message content such as "tired" to the PC 18, the information acquisition unit 34 of the multifunction machine 20 determines that the user is tired.

For example, when the character of the user is "impatient," the edit unit 38 of the multifunction machine 20 extracts the minimum information from the response information and generates the output information. This is to allow the user to refer to the output information in a short time. For example, when character information, an image and a graph are included in the response information, the edit unit 38 of the multifunction machine 20 minimizes the character information and generates the output information including the image and the graph as main information. In this example, the edit unit 38 of the multifunction machine 20 may generate the output information including only a map and menu information of a restaurant, may generate the output information including only a name and menu information of the restaurant, or may generate the output information including only the name and specially recommended menu of the restaurant.

Meanwhile, when the character of the user is "easygoing," the edit unit 38 of the multifunction machine 20 extracts the maximum information from the response information and generates the output information. This is to allow the user to refer to the output information in a relatively long time. For example, the edit unit 38 of the multifunction machine 20 generates the output information including a detailed description, an image and a graph. In this example, the edit unit 38 of the multifunction machine 20 generates the output information including detailed information of the restaurant, explanation of each menu, and a detailed map.

When the degree of fatigue of the user is relatively high (for example, when the degree of fatigue is equal to or greater than a threshold value), the edit unit 38 of the multifunction machine 20 may relatively increase the font size of a character string included in the output information, may minimize the character information, or may generate the output information including the image and the graph as main information. This is to make it easier for the tired user to refer to the output information. In this example, the edit unit 38 of the multifunction machine 20 generates the output information including only a relatively large map and a specially recommended menu.

Meanwhile, when the degree of fatigue of the user is relatively low (for example, when the degree of fatigue is less than the threshold), the edit unit 38 of the multifunction machine 20 extracts the maximum information from the response information and generates the output information. This is to allow the user to obtain detailed information from the output information. In this example, the edit unit 38 of the multifunction machine 20 generates the output information including detailed information of the restaurant, explanation of each menu, and a detailed map.

As described above, by editing the response information in accordance with the characteristics of the user, the output information is notified to the user according to the output form suitable for the characteristics of the user.

In addition, the edit unit 38 of the multifunction machine 20 may edit the response information in accordance with the information that the user conveys to the interaction partner (the information indicating the user's message content). For example, when the user conveys the number of pages to the automatic response AI by message content, the edit unit 38 of the multifunction machine 20 collects the response information on the page. For example, the edit unit 38 of the multifunction machine 20 may select information according to priorities of pieces of information included in the response information, thereby generating the output information in which the response information is summarized on the page. In addition, when the user conveys output of data having a specific format to the automatic response AI by the user's message content, the edit unit 38 of the multifunction machine 20 extracts the data having that format from the response information and generates the output information. For example, when the user designates output of image data, the edit unit 38 of the multifunction machine 20 extracts the image data from the response information and generates the output information. In addition, the user may designate, by message content, an information conveyance medium, the resolution at the time of output, the data amount, either color or monochrome, the display size, the font size and font type at the time of output, or the like.

Further, the edit unit 38 of the multifunction machine 20 may edit the response information according to a combination of the user's characteristics and the user's message content. For example, when the character of the user is "impatient," the automatic response AI issues the message content such as "Are you in a hurry?" When the user answers "Yes" or the like to convey to the automatic response AI that he/she is in a hurry, the edit unit 38 of the multifunction machine 20 extracts the minimum information from the response information and generates the output information.

(Selection of Superiority Device)

In Example 1, the selection unit 40 of the multifunction machine 20 may select a superiority device for processing the response information. In this case, the response information is retrieved and edited by the superiority device. By executing the processes with the superiority device in this way, so-called edge processing (edge computing environment) is implemented.

Hereinafter, the selection of a superiority device will be described in detail. The selection unit 40 of the multifunction machine 20 refers to the device management table illustrated in FIG. 5 to check the capability (functions and the performance), operation situation, installation position, and communication situation of each of the PC 18, the multifunction machine 20, the smartphone 22, and the robot 24, and also check the capability, operation situation and communication situation of the server 14.

The selection unit 40 of the multifunction machine 20 selects, for example, a device having the highest processing speed (for example, a device having the highest performance CPU or memory) as a superiority device based on the performance of the respective devices.

As an example, it is assumed that the PC 18 is selected as a superiority device. In this case, the controller 32 of the multifunction machine 20 transmits the input information acquired by the multifunction machine 20 to the PC 18. The retrieval unit 36 of the PC 18 retrieves the response information applicable to the input information from the protected information and the general-purpose information using the input information as a retrieval key. The edit unit 38 of the PC 18 generates the output information by editing the response information so as to be compatible with the information conveyance medium of the multifunction machine 20. The PC 18 transmits the output information to the multifunction machine 20. The controller 32 of the multifunction machine 20 notifies the output information, which is transmitted from the PC 18, to the user through the information conveyance medium of the multifunction machine 20. The retrieval and edit with the device having the highest processing speed reduce the time required for the retrieval and edit as compared with that in a case of retrieval and edit by other devices.

In this example, the retrieval by the retrieval unit 36 may be executed by the PC 18, and the edit by the edit unit 38 may be executed by the multifunction machine 20. In this case, the controller 32 of the PC 18 transmits the response information to the multifunction machine 20. The edit unit 38 of the multifunction machine 20 generates the output information by editing the response information transmitted from the PC 18 to be compatible with the information conveyance medium of the multifunction machine 20. Thus, the time required for the retrieval becomes shorter than that in a case where the retrieval is executed by a device other than the superiority device. Further, the on-demand capability by interaction is improved over a case where the edit is executed by a device other than the device (the multifunction machine 20) interacting with the user (the time taken to edit the response information according to the user's interaction content and notify the edited response information to the user becomes shorter).

In addition, the retrieval by the retrieval unit 36 may be executed by the multifunction machine 20 and the edit by the edit unit 38 may be executed by the PC 18.

Further, the PC 18 may notify the user of the output information. For example, when the user designates, in the multifunction machine 20, the PC 18 as a device for notifying the user of the output information, the PC 18 notifies the user of the output information. The PC 18 may be designated by user's message content or may be designated by another method. The retrieval by the retrieval unit 36 may be executed by the multifunction machine 20 or the PC 18. The edit unit 38 of the PC 18 generates the output information by editing the response information so as to be compatible with the information conveyance medium of the PC 18 and the controller 32 of the PC 18 notifies the user of the output information. Thus, even when the user changes a device to be used from the multifunction machine 20 to the PC 18, the output information is notified from the PC 18 to the user.

The selection unit 40 of the multifunction machine 20 may select the server 14 as a superiority device. Both of the retrieval and the edit may be executed by the server 14, or one of the retrieval and the edit may be executed by the server 14 and the other may be executed by the multifunction machine 20. For example, when the retrieval is executed by the server 14, the controller 32 of the multifunction machine 20 transmits the input information to the server 14. The retrieval unit 50 of the server 14 retrieves the response information applicable to the input information from the protected information and the general-purpose information using the input information as a retrieval key. The controller 46 of the server 14 transmits the response information to the multifunction machine 20. The edit unit 38 of the multifunction machine 20 generates the output information by editing the response information so as to be compatible with the information conveyance medium of the multifunction machine 20. The controller 32 of the multifunction machine 20 notifies the user of the output information through the information conveyance medium of the multifunction machine 20.

As another example of the selection of a superiority device, the selection unit 40 of the multifunction machine 20 may select a superiority device based on at least one of the operation situation, the installation position, or the communication situation of each device. For example, the selection unit 40 of the multifunction machine 20 may select a device that is activated but is not executing a process, as a superiority device, may select a device that is located closest to the current position of the user, as a superiority device, or may select a device having no communication failure and having the highest communication speed as a superiority device. Further, the selection unit 40 of the multifunction machine 20 may select a superiority device by making a comprehensive determination on the operation situation, the installation position and the communication situation. Specifically, the selection unit 40 of the multifunction machine 20 may determine a ranking of each device with respect to each of the operating situation, the installation position and the communication situation and may select a device having the highest total ranking (for example, the largest sum of rankings) as a superiority device. Thus, the time taken until the output information is notified to the user may be shorter than that in a case where the retrieval and edit are executed by a device other than the superiority device. In this case as well, both the retrieval and the edit may be executed by the superiority device, or one of the retrieval and the edit may be executed by the superiority device and the other may be executed by the multifunction machine 20.

As a further example of the selection of the superiority device, when software to be used for notifying the user of the response information is determined in advance, the selection unit 40 of the multifunction machine 20 may select a device that can use the software, as a superiority device. For example, when data that can be displayed or edited by specific software is included in the response information, the selection unit 40 of the multifunction machine 20 selects a device in which the specific software is installed, as a superiority device. For example, it is assumed that in a case where the retrieval unit 36 of the multifunction machine 20 obtains the response information by retrieval, 3DCAD data that can be displayed and edited by 3DCAD software is included in the response information and the 3DCAD software has not been installed in the multifunction machine 20. In this case, the selection unit 40 of the multifunction machine 20 selects a device in which the 3DCAD software is installed, as a superiority device. For example, it is assumed that the 3DCAD software is installed in the PC 18. The software installed in the device is registered in the device management table as the capability of the device. The selection unit 40 of the multifunction machine 20 refers to the device management table to identify software installed in each device. The controller 32 of the multifunction machine 20 transmits the response information to the PC 18. The edit unit 38 of the PC 18 generates the output information by editing the response information so as to be compatible with the information conveyance medium of the multifunction machine 20. For example, the edit unit 38 of the PC 18 converts 3DCAD data into data that can be displayed even in the multifunction machine 20. The controller 32 of the PC 18 transmits the output information to the multifunction machine 20, and the controller 32 of the multifunction machine 20 outputs the output information to the user through the information conveyance medium of the multifunction machine 20. For example, the controller 32 of the multifunction machine 20 may cause the display of the UI unit 28 to display the data into which the 3DCAD data is converted, or may print the data. Thus, even when the specific software is not installed in the multifunction machine 20 and the multifunction machine 20 may not process the response information by itself, the multifunction machine 20 may notify the user of the output information. In addition, when the PC 18 is designated as a device for notifying the output information to the user, the edit unit 38 of the PC 18 may edit the response information so as to be compatible with the information conveyance medium of the PC 18, and the controller 32 of the PC 18 may notify the user of the output information through the information conveyance medium of the PC 18.

As a still further example of the selection of the superiority device, the selection unit 40 of the multifunction machine 20 may select a device having the highest processing quality as a superiority device. The superiority device in this case is, for example, a device capable of generating output information having a higher quality (higher precision) than other devices. For example, a device having a function of processing color image data corresponds to a device (superiority device) capable of generating output information of a higher quality than a device having no function of processing color image data. In addition, a device having a retrieval function of higher precision corresponds to a device capable of generating output information having a higher quality than a device having a retrieval function of lower precision. In addition, a device equipped with a higher-level image processing engine corresponds to a device capable of generating output information having a higher quality than a device having a lower-level image processing engine. Further, a device having a higher-level voice processing function corresponds to a device capable of generating output information having a higher quality than a device having a lower-level voice processing function. In addition, a device having a higher-level translation function corresponds to a device capable of generating output information having a higher quality than a device having a lower-level translation function. In addition, a device equipped with a higher-level AI corresponds to a device capable of generating output information having a higher quality than a device having a lower-level AI. Besides these, a device having a higher-level function may correspond to a device which generates output information having a higher quality than a device having a lower-level function. The selection unit 40 refers to the capabilities of the devices registered in the device management table to select a device having the highest processing quality as a superiority device. By selecting the device having the highest processing quality as the superiority device, output information having a higher quality than that in a case where the processing is performed by a device having the lower processing quality is notified to the user.

As a still further example of the selection of the superiority device, the selection unit 40 of the multifunction machine 20 may select a superiority device based on a history of interaction between the user and the interaction partner (the automatic response AI) installed in each device. Information indicating the interaction history is managed, for example, for each user and is associated with information (user identification information) for identifying the user. The information indicating the interaction history may be managed for each user and may be stored in the storage unit 30 of a device with which the interaction is performed, or may be managed for each device and for each user and stored in the server 14. The selection unit 40 of the multifunction machine 20 may select a device having the largest number of interactions with the user who is interacting with the multifunction machine 20 (the user is identified based on the user's personal information) as a superiority device. Thus, a device frequently interacting with the user is selected as the superiority device. In addition, the selection unit 40 of the multifunction machine 20 may select a device most frequently mentioned in the interaction, including the user and other users, as a superiority device. Thus, a device that frequently gets into the topic is selected as the superiority device. In addition, the selection unit 40 of the multifunction machine 20 may select a device most frequently instructed to execute a process during the interaction as a superiority device. Thus, a device having the relatively large number of times of actual execution of the process is selected as the superiority device.

Example 2

Figure 7:
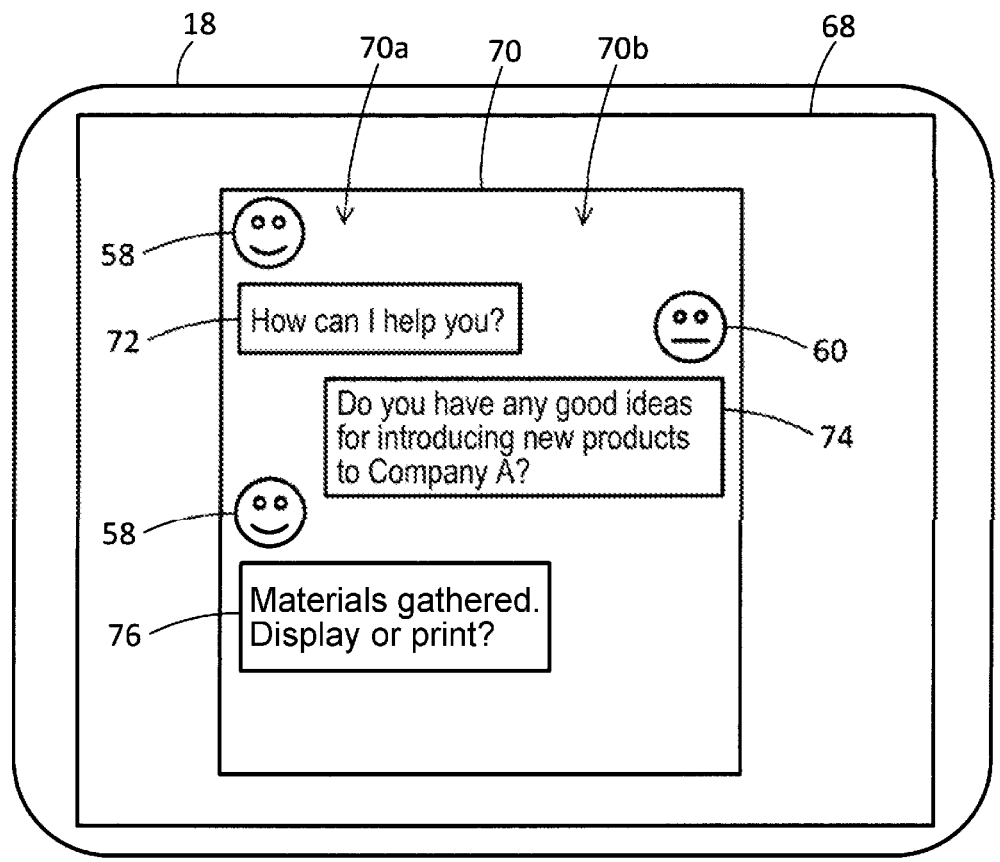
FIG. 7 is a view illustrating a screen.

Example 2 will be described with reference to FIG. 7. In Example 2, the user interacts with the automatic response AI of the PC 18. FIG. 7 illustrates an example of a screen displayed on the PC 18.

The controller 32 of the PC 18 causes the display of the UI unit 28 of the PC 18 to display a screen 68 in which an area 70 where the content of interaction between the user and the automatic response AI are displayed is displayed. For example, when a chatting program is instructed to be activated by the user, the controller 32 of the PC 18 displays the area 70 in the screen 68. The area 70 corresponds to the screen 56 of Example 1 and is a user interface for the user to interact with the automatic response AI. Similarly to Example 1, information indicating the user's message content and information indicating the message content of the automatic response AI are displayed in the area 70. For example, the image 58 associated with the automatic response AI and the message content of the automatic response AI are displayed in a display area 70*a*. The image 60 associated with the user and the user's message content are displayed in a display area 70*b*.

First, the automatic response AI issues a general question such as "How can I help you?", and a character string indicating the question is displayed in the display area 70*a* as message content 72 of the automatic response AI.

Next, when the user posts a message that "Do you have any good ideas for introducing new products to Company A?" or the like, message content 74 is displayed in the display area 70*b*.

The information acquisition unit 34 of the PC 18 acquires information indicating the message content 74 as interaction information that the user conveys to the interaction partner (the automatic response AI). Further, the information acquisition unit 34 of the PC 18 acquires personal information of the user from an employee ID card (IC card) or a device, for example, a smartphone or the like) carried by the user.

The above personal information and interaction information constitute the input information. Using the input information as a retrieval key, the retrieval unit 36 of the PC 18 retrieves information applicable to the input information from the protected information and the general-purpose information.

For example, business results, customer characteristics, business skills (education and training), proposal materials on new products created by internal sales employees, and the like are managed, and these information are included in the protected information. The retrieval unit 36 of the PC 18 retrieves business results information, customer information, business skills information, proposal materials information, and the like from the protected information.

Further, the retrieval unit 36 of the PC 18 uses the Internet or SNS to retrieve information related to Company A (for example, press release information, information posted on newspaper, and the like).

The personal information, the interaction information, the information extracted from the protected information, and the information extracted from the general-purpose information in Example 2 are summarized as follows.

Personal information: user's employee number
Interaction information: "Do you have any good ideas for introducing new products to Company A?"
Information extracted from protected information: information on business result information, customer information, business skills information, proposal materials information
Information extracted from general-purpose information: press release information of Company A and information posted on newspaper.

The retrieval unit 36 of the PC 18 analyzes the personal information, the interaction information, the information extracted from the protected information, and the information extracted from the general-purpose information and uses the analysis result to retrieve (i) information on one or more in-house proposal materials conforming to the business type of Company A and the user's own business skill, and (ii) published information on Company A from the protected information and the general-purpose information. The information obtained by the above retrieval corresponds to the response information from the interaction partner (automatic response AI).

The retrieval unit 36 of the PC 18 may obtain the response information through the execution of the retrieval, or the retrieval unit 50 of the server 14 may obtain the response information through the execution of the retrieval. When the retrieval is executed by the server 14, the PC 18 transmits the input information (information including the personal information and the interaction information) to the server 14, and the retrieval unit 50 of the server 14 retrieves the response information using the input information transmitted from the PC 18 as a retrieval key. The server 14 transmits the response information to the PC 18.

When the response information is obtained as described above, the edit unit 38 of the PC 18 edits the response information to be compatible with the information conveyance medium of the PC 18. As a result, the output information is generated. The PC 18 has a display medium (display) and a voice medium (speaker) as the information conveyance medium. The edit unit 38 of the PC 18 edits the response information such that the response information may be displayed on the display of the PC 18, for example. Specifically, the edit unit 38 of the PC 18 adjusts the layout of a character string, an image, a table, a graph, and the like indicated by the response information. In addition, the edit unit 38 of the PC 18 may give a priority to each piece of information included in the response information and may include information whose priority is equal to or higher than a predetermined priority in the output information. As an example, the edit unit 38 of the PC 18 edits the response information into information that may be printed on one A4 sheet, and generates data (for example, text data, portable document format (PDF) data, or the like) having a predetermined format. The above edit may be executed by the edit unit 52 of the server 14. In this case, the server 14 transmits the output information to the PC 18.

When the output information is generated as described above, the controller 32 of the PC 18 controls the notification of the output information to the user. For example, the controller 32 of the PC 18 displays the output information in the display area 70a as message content 76 of the automatic response AI. For example, the message content 76 such as "Materials gathered. Display or print?" are displayed. Further, without or while displaying the message content 76, the controller 32 of the PC 18 may output the output information as voice information using a speaker. In this case, the message content 76 is read. This reading may be executed by the automatic response AI. When the user gives a display instruction to the PC 18, the controller 32 of the PC 18 displays the above text data or PDF data on the screen 68. For example, materials related to own company's products that are useful for Company A, business information of Company A, and the like are displayed. When the user gives a print instruction, the PC 18 transmits the PDF data to the multifunction machine 20 and causes the multifunction machine 20 to print the PDF data. The multifunction machine 20 prints the output information on one A4 sheet according to the print instruction.

As described above, according to Example 2, the response information from the interaction partner (the automatic response AI) is edited into the information compatible with the information conveyance medium of the PC 18 and is notified to the user.

As in Example 1, when the edit unit 38 of the PC 18 may not edit the response information to be compatible with the notification unit of the PC 18, the controller 32 of the PC 18 transmits the response information and the input information to a device (external device) other than the PC 18. The output information is generated by the external device editing the response information, and the output information is notified to the user through an information conveyance medium of the external device.

Further, similarly to Example 1, the edit unit 38 of the PC 18 may edit the response information in accordance with the characteristics of the user. For example, when the character of the user is "impatient," the edit unit 38 of the PC 18 organizes the materials for Company A into the minimum content (for example, materials including an image and a graph as main information). Meanwhile, when the character of the user is "easygoing," the edit unit 38 of the PC 18 edits the materials for Company A into the maximum content (for example, materials including detailed information on Company A, detailed information on new products, detailed images, relatively large graphs, and the like). Further, the edit unit 38 of the PC 18 may edit the response information according to the degree of fatigue of the user.

Similarly to Example 1, the edit unit 38 of the PC 18 may edit the response information in accordance with the information that the user conveys to the interaction partner (the user's message content) or a combination of the characteristics of the user and the user's message content. For example, when the character of the user is "impatient," the automatic response AI issues message content such as "If you are in a hurry, put it on 5 pages?" When the user posts a message that "Yes" or the like to convey the automatic response AI that he/she is in a hurry, the edit unit 38 of the PC 18 extracts the minimum information (for example, an image, a graph, and the like of a new product) from the response information and generates the output information.

(Selection of Superiority Device)

In Example 2 as well, the selection unit 40 of the PC 18 may select a superiority device for processing the response information. The process by the selection unit 40 of the PC 18 is the same as the process by the selection unit 40 of the multifunction machine 20 described in Example 1. In Example 2 as well, the retrieval by the retrieval unit 36 may be executed by the superiority device (which may be the server 14), and the edit by the edit unit 38 may be performed by the PC 18. In this manner, the on-demand capability by interaction is improved over a case where the response information is edited by a device other than the PC 18 with which the user is interacting. Conversely, the retrieval by the retrieval unit 36 may be executed by the PC 18, and the edit by the edit unit 38 may be executed by the superiority device (which may be the server 14). In addition, the output information may be notified to the user by the superiority device.

Example 3

Figure 8:
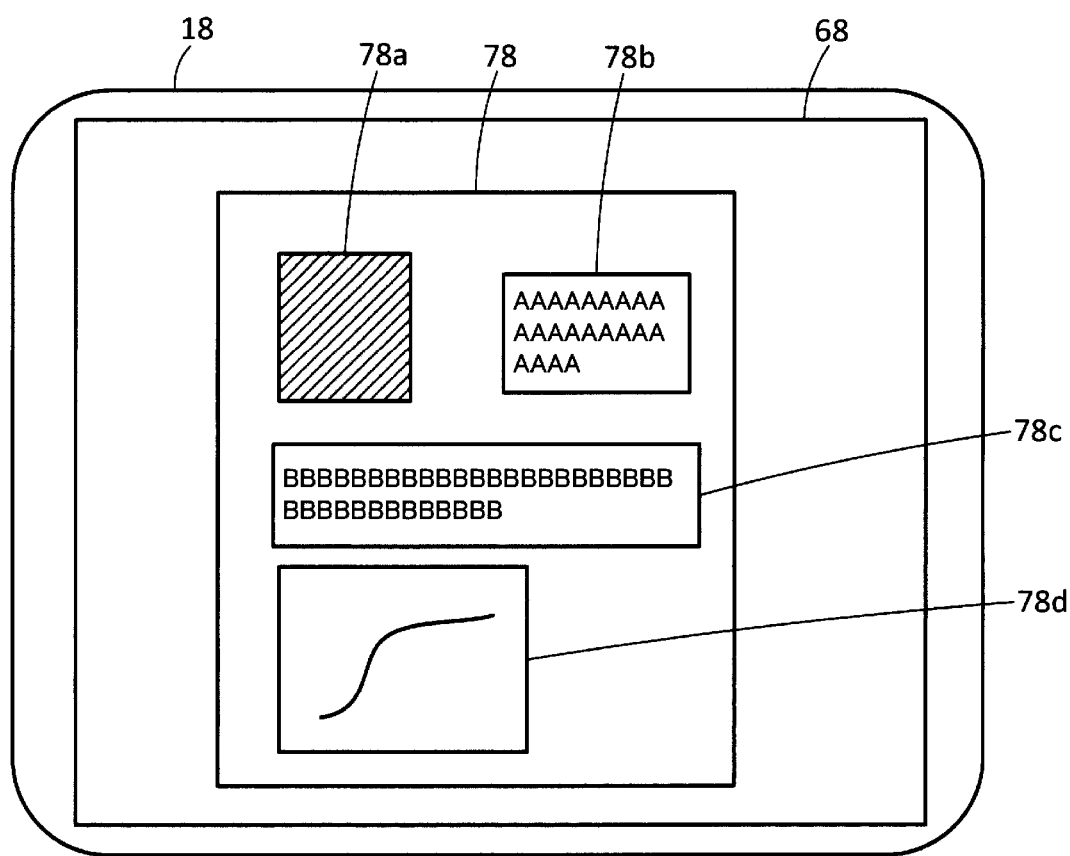
FIG. 8 is a view illustrating a screen.

Example 3 will be described with reference to FIGS. 7 to 9. In Example 3, the user interacts with the automatic response AI installed in the PC 18. As in Example 2, it is assumed that the interaction illustrated in FIG. 7 is performed and the same response information as in Example 2 is obtained.

As described in Example 2, the edit unit 38 of the PC 18 edits the response information such that the response information may be displayed on the display screen 68 of the PC 18, for example. Specifically, the edit unit 38 of the PC 18 adjusts the layout of a character string, an image, a table, a graph, and the like indicated by the response information. As a result, the output information is generated. The controller 32 of the PC 18 displays the output information generated by the edit unit 38 of the PC 18 on the screen 68. The output information displayed on the screen 68 is illustrated in FIG. 8. Data 78 may be, for example, data having an image format, data having a document format, or data of a Web page (for example, data described in HTML). As an example, the data 78 is PDF data. The data 78 includes an image 78a, character strings 78b and 78c, and a graph 78d extracted from the response information. Since the size of the display of the PC 18 is relatively large, the data 78 includes relatively detailed information. For example, the data 78 includes the image 78a, the character strings 78b and 78c representing relatively detailed descriptions, and the graph 78d expressed relatively large.

In Example 3, the user changes a device to be used. For example, the user conveys the device to be used to the automatic response AI, by user's message content. The user inputs information of the device to be used to the PC 18 by character, voice or image. The input information is transmitted to the automatic response AI as the user's message content. The controller 32 of the PC 18 transmits the input information and the response information to the device to be used, which is designated by the user. The edit unit 38 of the device to be used receives the input information and the response information from the PC 18 and edits the response information to be compatible with the information conveyance medium of the device. As a result, the output information is generated in the device to be used. The controller 32 of the device controls notification of the output information.

For example, it is assumed that the user changes the device to be used from the PC 18 to the smartphone 22. In this case, the user inputs the information of the smartphone 22 as the device to be used, to the PC 18. The controller 32 of the PC 18 transmits the input information and the response information to the smartphone 22. The edit unit 38 of the smartphone 22 receives the input information and the response information from the PC 18 and edits the response information to be compatible with the information conveyance medium of the smartphone 22. Specifically, the edit unit 38 of the smartphone 22 adjusts the layout of a character string, an image, a table, a graph, and the like indicated by the response information. In addition, since the size of the display of the smartphone 22 is relatively small, the edit unit 38 of the smartphone 22 generates relatively simple output information. For example, the edit unit 38 of the smartphone 22 may create a summary of character information, or may select an image, a table or a graph to be displayed. The controller 32 of the smartphone 22 causes the display of the UI unit 28 of the smartphone 22 to display the output information generated by the edit unit 38 of the smartphone 22.

Figure 9:
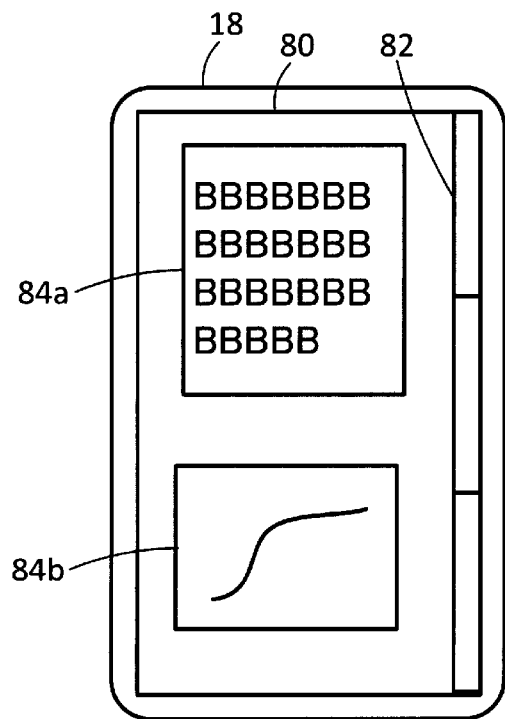
FIG. 9 is a view illustrating a screen.

FIG. 9 illustrates an example of a screen displayed on the display of the smartphone 22. The edit unit 38 of the smartphone 22 creates the output information as a Web page, for example, and displays the Web page on a screen 80. A scroll bar 82 is displayed on the Web page, and the user may scroll the Web page by operating the scroll bar 82. Since the size of the screen 80 of the smartphone 22 is smaller than the size of the screen 68 of the PC 18, relatively simple information is included in the Web page. For example, the Web page includes a character string 84a representing a relatively simple description, and a graph 84b. Images and other character strings may be included in other pages in the Web page.

Further, as in Example 1, the edit unit 38 of the smartphone 22 may edit the response information in accordance with the characteristics of the user (character or a fatigue degree). For example, when the degree of fatigue of the user is relatively high, the edit unit 38 of the smartphone 22 may increase the font size of characters included in the character string 84a, or may include more graphs or images in the Web page. Further, when the character of the user is "impatient," the edit unit 38 of the smartphone 22 may include more graphs in the Web page.

As described above, according to Example 3, even when the user changes the device to be used, the response information from the interaction partner (automatic response AI) is edited into the information compatible with the information conveyance medium of the changed device and is notified to the user.

(Selection of Superiority Device)

In Example 3 as well, the selection unit 40 of the PC 18 may select a superiority device for processing the response information. The process by the selection unit 40 of the PC 18 is the same as the process by the selection unit 40 of the multifunction machine 20 described in Example 1.

Example 4

Example 4 will be described with reference to FIG. 10. In Example 4, the user interacts with the automatic response AI of the robot 24. As in Example 2, it is assumed that the interaction illustrated in FIG. 7 is performed and the same response information as in Example 2 is obtained.

The retrieval unit 36 of the robot 24 may execute retrieval to obtain the response information, or the retrieval unit 50 of the server 14 may execute retrieval to obtain the response information. When the retrieval is executed by the server 14, the robot 24 transmits the input information (information including the personal information and the interaction information) to the server 14, and the retrieval unit 50 of the server 14 retrieves the response information using the input information transmitted from the robot 24 as a retrieval key. The server 14 transmits the response information to the robot 24.

When the response information is obtained as described above, the edit unit 38 of the robot 24 edits the response information to be compatible with the information conveyance medium of the robot 24. As a result, the output information is generated. The robot 24 has a display medium (display) and a voice medium (speaker) as the information conveyance medium. The edit unit 38 of the robot 24 edits the response information so that the response information may be displayed on the display of the robot 24, for example, and generates voice information of the output information obtained by the edit. These edits may be executed by the edit unit 52 of the server 14. In this case, the server 14 transmits the output information to the robot 24.

When the output information is generated as described above, the controller 32 of the robot 24 controls notification of the output information to the user. For example, the controller 32 of the robot 24 causes the display of the UI unit 28 to display the output information as message content of the automatic response AI, and outputs the output information as voice information.

Figure 10:
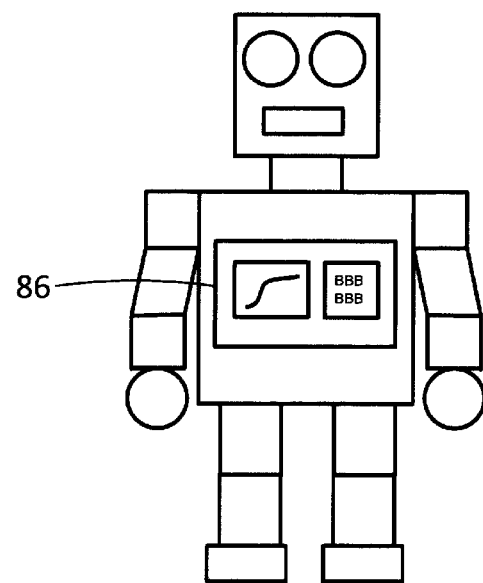
FIG. 10 is a view illustrating a robot.

An example of the robot 24 is illustrated in FIG. 10. The robot 24 has a display 86 on which the output information is displayed. For example, a graph or an explanatory sentence included in materials as the output information is displayed. Further, the controller 32 of the robot 24 may explain the materials by voice.

Further, when the user posts a message such as "Please summarize in about 5 minutes" or the like by message content, the edit unit 38 of the robot 24 may edit the response information so that materials (output information) that may be explained in five minutes at an average speaking speed may be generated.

As described above, according to Example 4, the response information from the interaction partner (the automatic response AI) is edited into the information compatible with the information conveyance medium of the robot 24 and is notified to the user.

(Selection of Superiority Device)

In Example 4 as well, the selection unit 40 of the robot 24 may select a superiority device for processing the response information. The process by the selection unit 40 of the robot 24 is the same as the process by the selection unit 40 of the multifunction machine 20 described in Example 1. In Example 4 as well, the retrieval by the retrieval unit 36 may be executed by the superiority device (which may be the server 14), and the edit by the edit unit 38 may be executed by the robot 24. Thus, the on-demand capability by interaction is improved over a case where the response information is edited by a device other than the robot 24 with which the user is interacting. Conversely, the retrieval by the retrieval unit 36 may be executed by the robot 24, and the edit by the edit unit 38 may be executed by the superiority device (which may be the server 14). In addition, the output information may be notified to the user by the superiority device.

Each of the above devices and servers is implemented by cooperation of hardware and software as an example. Specifically, each of the devices and servers includes one or more processors (not illustrated) such as a CPU. When the one or more processors read and execute a program stored in a storage device (not illustrated), the functions of the respective components of the devices and servers are achieved. The program is stored in a storage device via a recording medium such as a CD or a DVD, or via a communication path such as a network. As another example, the various components of the devices and the servers may be implemented by hardware resources such as processors, electronic circuits or application specific integrated circuits (ASICs). A device such as a memory may be used for the implementation. As still another example, the respective components of the devices and the servers may be implemented by digital signal processors (DSPs), field programmable gate arrays (FPGAs) or the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a controller configured to function as a plurality of programmed units comprising an acquisition unit configured to acquire input information including (i) information on a user and (ii) information that the user conveys to an interaction partner, wherein the controller is configured to generate response information corresponding to the input information and to control transmission of the response information and the input information to an external device, wherein the response information comprises moving image data, the external device is a computer connected to a display, and the computer reproduces the moving image data on the display,
    wherein the interaction partner comprising an automatic response artificial intelligence (AI), and the response information further corresponding to characteristics and condition of the user,
    wherein in condition where the external device cannot edit the moving image data to be compatible with an information conveyance medium of the external device, the interaction partner notifies the user using another information conveyance medium of the external device suitable for notifying the response information.

2. The information processing apparatus according to claim 1, wherein the controller edits personal information of the user included in the input information into information based on which the user is not identified to control the transmission of the input information.

3. The information processing apparatus according to claim 2, wherein the acquisition unit acquires the personal information of the user as the information on the user from a device carried by the user.

4. The information processing apparatus according to claim 1, wherein the controller generates an output information by editing the response information in further accordance with the information that the user conveys to the interaction partner.

5. The information processing apparatus according to claim 4, wherein the acquisition unit acquires personal information of the user as the information on the user from a device carried by the user.

6. The information processing apparatus according to claim 1, wherein the acquisition unit acquires personal information of the user as the information on the user from a device carried by the user.

7. The information processing apparatus according to claim 1, wherein the acquisition unit acquires personal information of the user as the information on the user from a device carried by the user.

8. The information processing apparatus according to claim 1, wherein the acquisition unit acquires personal information of the user as the information on the user from a device carried by the user.

9. The information processing apparatus according to claim 1, wherein the acquisition unit acquires personal information of the user as the information on the user from a device carried by the user.

10. The information processing apparatus according to claim 1, wherein the acquisition unit acquires personal information of the user as the information on the user from a device carried by the user.

11. An information processing method comprising:
    acquiring input information including (i) information on a user and (ii) information that the user conveys to an interaction partner;
    generating response information corresponding to the input information, wherein the response information comprises moving image data;
    transmitting the response information and the input information to an external device by a controller, wherein the external device is a computer connected to a display; and reproducing the moving image data on the display by the computer,
    wherein the interaction partner comprising an automatic response artificial intelligence (AI), and the response information further corresponding to characteristics and condition of the user,
    wherein in condition where the external device cannot edit the moving image data to be compatible with an information conveyance medium of the external device, the interaction partner notifies the user using another information conveyance medium of the external device suitable for notifying the response information.

12. A non-transitory computer readable medium storing a program that causes a computer to execute information processing, the information processing comprising:
    acquiring input information including (i) information on a user and (ii) information that the user conveys to an interaction partner;
    generating response information corresponding to the input information, wherein the response information comprises moving image data,
    transmitting the response information and the input information to an external device by a controller, wherein the external device is a computer connected to a display; and
    reproducing the moving image data on the display by the computer,
    wherein the interaction partner comprising an automatic response artificial intelligence (AI), and the response information further corresponding to characteristics and condition of the user,
    wherein in condition where the external device cannot edit the moving image data to be compatible with an information conveyance medium of the external device, the interaction partner notifies the user using another information conveyance medium of the external device suitable for notifying the response information.

\* \* \* \* \*